W. T. FARRE.

Methods of Bending Tubing.

No. 5,582. Reissued September 30, 1873.

Witnesses

John M. Reid

Ben S. Clark.

Inventor.

W T Farre

AM. PHOTO-LITHOGRAPHIC Co. N.Y. (OSBORNE'S PROCESS)

UNITED STATES PATENT OFFICE.

WILLIAM T. FARRE, OF MONTREAL, CANADA.

IMPROVEMENT IN THE METHODS OF BENDING TUBING.

Specification forming part of Letters Patent No. 133,636, dated December 3, 1872; reissue No. 5,582, dated September 30, 1873; application filed July 17, 1873.

DIVISION B.

*To all whom it may concern:*

Be it known that I, WILLIAM THEODORE FARRE, of the city of Montreal, district of Montreal, Province of Quebec, Dominion of Canada, have invented a new manufacture, consisting of seamless bent tubing, made of lead or other soft metal, of which the following is a specification, reference being had to the accompanying drawings forming part thereof.

The invention relates to a curved tube, whether in the form of stench-trap, or having only a single bend or elbow, made of a single piece of lead or other equivalent soft metal, without a seam or joint, the curved portion of which has been subjected, in the formation of the curve, to the compacting and strengthening action of beating and drawing, as hereinafter described.

The process or method by which I form my new curved pipe is a kind of pressing—something analogous to the spinning of sheet metal in the lathe—which reduces the thickness of a previously-cast tube, the said tube having been cast with a surplus of metal on the places where the outside of the curve is desired. When such a casting is cut at the point where the curve is intended to be it shows, in cross-section, a gradually-increasing thickness of metal on both sides from the place where the inside of the curve would be, and round to that place where the outside would be, the length and the radius of the curve being determined by the length and the mass in the thickened part of the casting.

Figure 1:
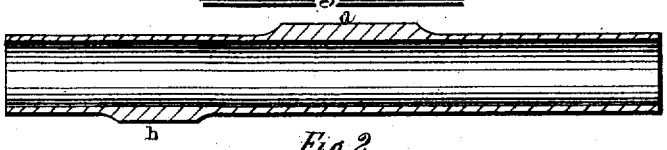
Figure 2:
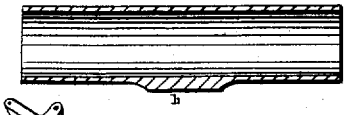
Figure 4:
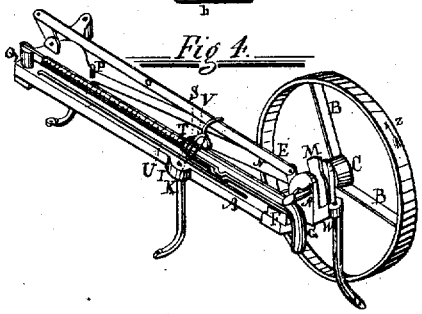
Figure 3:
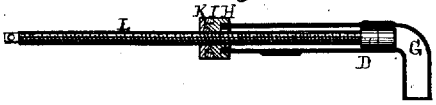
Figure 5:
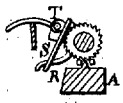
Figure 6:
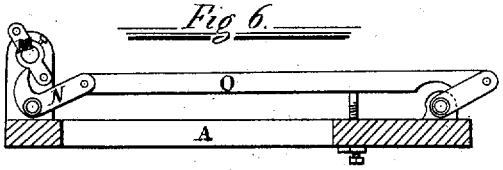
Figure 7:
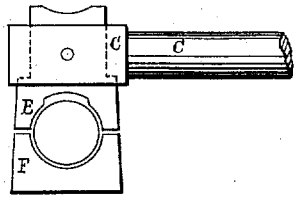
Figure 8:
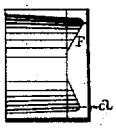

Figures 1 and 2, central sections of a cast lead pipe, having a surplus of metal where it is designed to form curves in the tube, Fig. 1 representing a casting designed to form a double reverse curve for a stench-trap, and Fig. 2 a single curve or elbow. The surplus lead extends around the tube, as in the space between two circles eccentric to each other, it being thickest along the line of the outside of the curve, and gradually diminishing laterally. When a tube thus cast is placed upon a suitable mandrel, and the thick portion *a* (or *b*) on one side of the pipe is beaten and drawn, so as to reduce it to the thickness of the other parts without increasing the diameter of the pipe, it is evident that the wall on the side where this operation is performed must be extended longitudinally, thus forming a bend or elbow in the tube, as seen in Fig. 3, which is a central section of a lead tube with such an elbow, and the mandrel upon which it is formed lying within it. I have invented a machine whereby this beating or milling operation may be conveniently and very perfectly performed, which I have made the subject of a separate claim in a subdivision of the original patent in this reissue. Fig. 4 is a perspective view of the said machine. Fig. 5 is a ratchet combination, (seen from behind,) and a section of the frame or lifting-bar on the line U. Fig. 6 is a side elevation of the dog, bell-crank lever, lifting-bar, and section of the frame on the line W. Fig. 7 is a side elevation of the axle and dies. (Seen from the fore end of the machine.) Fig. 8 is the lower die. (Seen from above.)

The machine consists of a frame, A, Fig. 4, provided with two uprights, in which the axle C is hung. In the sliding stud Q, at the opposite end of the machine, the feed-screw and mandrel L D are hinged in such a manner that the head of the feed-screw or mandrel D is resting in the lower die F. The stud Q is made sliding, for the purpose of adjusting the mandrel lengthwise to the desired position in the die F. When the axle with the upper die E (or dies, as the die-bar has a die at each end) is moved in the direction of the arrow Z a small part of its revolution, from the position shown in Fig. 4, it will stand, with its stroke nearly finished, directly over the front of the lower die, as seen in Fig. 7. The device for imparting feed-motion, Figs. 3, 5, and 6, consists of a dog, M, provided with two lugs, and fastened on the axle C. This dog actuates the bell-crank lever N, which puts the lifting-bar O in motion. On the feed-screw L the feed-block H fits loosely over the top of the threads. Back of H comes the ratchet-wheel nut K, and between them the pawl-carrier I is fitted, as shown in Fig. 3. The feed-block H is provided with two studs, which embrace a flange cast on the frame-piece, and also with a wire, R, the latter holding the one loop of the rubber spring S, Fig. 5. The other loop of the spring S is lying around the pawl T. This spring S throws the pawl-carrier back when the lifting-bar O falls down. The feed is intermittent, only feeding when the dies are not working. P, the adjusting-screw, serves to limit the descent of bar O, and thus to regulate the amount of feed. The working faces of the upper dies are slanted, or beveled slightly, so that no scraping action can take place; but the faces will work on the lead or other metal in the manner of a burnisher; consequently they ought to be well hardened and polished. The lower die commences its work from the line on either side of the tube where the upper dies stop working, and works from there downward on either side of the tube for about sixty degrees. The remaining sixty degrees, more or less, in the bottom of the die, needs no working, and the working rim on the lower die is, in this place, hollowed slightly down, to prevent it from working. The working rim in the lower die consists in a convex rim lying inside in the front end of the die. This rim is running all along the front lip of the die, and is convex in its cross-section. It is not separate from the die, but formed in the metal of the die. It is marked *a* on Fig. 8. This rim is, of course, the die proper, and is of the size of the tube desired. The tube-casting, which is something larger in the thickened part, cannot, consequently, come down until the upper die forces it down, and in doing this both dies act upon and displace the eccentric portions of the tube, reducing it thus to a tube with walls of equal thickness; but as there was more metal to stretch out on the upper part of the tube than on the side, and nothing at all underneath, the tube will form a curve downward, and said curve being proportionate to the excess of the mass of surplus metal in the casting.

To work the machine, insert a casting from the front end of the machine around the mandrel D until its inner end enters into its serrated seat in the feed-block H. Set the thickest of the thickened part above; oil the casting; put the machine in motion, either by a belt, a coupling, or a crank, in the direction of the arrow, Fig. 4, and let it work until the curve is formed. When there is another curve to form, as in a stench-trap, withdraw the half-finished tube, turn it, and insert it again. The upper dies will then play inside in the curve already finished.

It is obvious that a curved pipe thus formed, being subjected in the process of making to the compacting and strengthening action of beating and drawing, as is accomplished in this machine, will be greatly superior to those that are cast merely in molds, the compactness of the metal imparted by the process of making giving the curved walls of the tube greater strength, and detecting any imperfections that may exist in the casting, and closing all minute apertures not detected.

I claim as my invention—

The method or art of making bent tubes of soft metal, of a single piece of metal, without a seam, by casting a tube with surplus metal where the outside of the bend is to be, and then forming the bend by beating or rolling the surplus metal to a uniform thickness with the rest of the tube without increasing the diameter, substantially as described.

Witnesses: W. T. FARRE.

JOHN M. REID,

BEN. S. CLARK.